INVENTORS.
WU WAI CHAO
ROBERT W. STEPHAN
WALTER J. ZOYA
BY
*Van Meter and George*
ATTORNEYS

INVENTORS.
WU WAI CHAO
ROBERT W. STEPHAN
WALTER J. ZOYA

BY

ATTORNEYS

United States Patent Office 3,499,391
Patented Mar. 10, 1970

3,499,391
POWER TRANSMISSION
Wu Wai Chao, Bloomfield Hills, Robert W. Stephan, Detroit, and Walter J. Zoya, Troy, Mich., assignors to Sperry Rand Corporation, Troy, Mich., a corporation of Delaware
Filed Apr. 15, 1968, Ser. No. 721,220
Int. Cl. F04b 1/02, 1/16, 39/00
U.S. Cl. 103—162          2 Claims

ABSTRACT OF THE DISCLOSURE

A fluid pressure energy translating device of the axial piston type including a pumping mechanism rotatably mounted on a rigid inner structure within an inner housing which is flexibly mounted within and isolated from an outer housing.

BACKGROUND OF THE INVENTION

This invention relates to power transmissions, and is particularly applicable to those of the type comprising two or more fluid pressure energy translating devices, one of which may function as a pump, and another as a fluid motor.

This invention is generally concerned with pumps and motors of the axial piston type, and in particular, this invention relates to improvements in the construction of such units.

In devices of this type, which comprise a revolving cylinder barrel having a plurality of parallel cylinders therein within which pistons are reciprocated by means of a swash plate device, it is customary to provide a rotary valve mechanism which is operated by the rotation of the cylinder barrel for the purpose of alternately connecting each cylinder bore with the inlet and outlet passage of the device. Many machines of this character utilize a swash plate which is adapted to rotate about an axis which is perpendicular to the driving means so as to vary the fluid output of the device. In such a device, the swash plate is rotatably mounted on bearing means which, in turn, are integral with the housing of the device. It is also customary in such devices to utilize a stationary, flat valve plate in which the cylinder barrel is abutting and in fluid sealing relationship to achieve the aforementioned alternate connection of each cylinder bore with the inlet and outlet passages. Generally, in such devices, the valve plate, inlet, and outlet passages are an integral part of the cover which houses the aforementioned rotating mechanisms and transmits noise and vibrations created therein to the ambient atmosphere and the adjacent structure.

It would be very desirable to use such a device in the transmission of power in numerous environments where the attendant noise and vibration levels of a similar device of conventional construction would be totally unacceptable.

It is known that as pump speed and pressure are increased, there is always an accompanying increase in pump noise. Thus, to obtain a quiet pump installation, operation should always be at low speeds and pressures. In many instances, a satisfactory noise level means the selection of a large, slow pumping unit to achieve the same power output of a substantially smaller unit operating at a much higher speed.

The general increase in pump loudness with increased speed may be attributed to a number of factors: first, the sound frequencies generated by a pump increase with pump speed, and as the frequency of sound increases, the sound becomes more objectionable to the human ear, even when the level of noise remains constant; and, second, the intensities of speed-related sounds increase with an increase in speed. This is due to a combination of several factors, including local cavitation of the pumping fluid as it passes at increasing speed through the pump passages, increased impact forces between parts. The excitation spectrum of the significant piston harmonics also broadens, thus increasing the number of resonant responses.

SUMMARY OF THE INVENTION

This invention comprises a fluid pressure energy translating device of the axial piston type wherein a pumping mechanism is supported on a rigid inner structure and said inner structure being mounted within, and isolated from an outer structure by means of a plurality of flexible bushings.

It is an object of this invention to provide a rotary fluid pressure energy translating device of the axial piston type having a construction which contributes to the reduction in the general noise radiated from such devices.

It is also an object of this invention to provide a rotary fluid pressure energy translating device of the axial piston type having a construction which isolates the pumping mechanism vibrations and running loads from the outer housing.

It is another object of this invention to provide a rotary fluid pressure energy translating device of the axial piston type having a construction which is readily adapted to low cost manufacturing and which is easy to maintain and assemble and disassemble.

Further objects and advantages of the present invention will be apparent from the following description, reference being made to the accompanying drawings wherein a preferred form of the present invention is clearly shown.

IN THE DRAWINGS

DESCRIPTION OF THE PREFERRED EMBODIMENT

Figure 1:
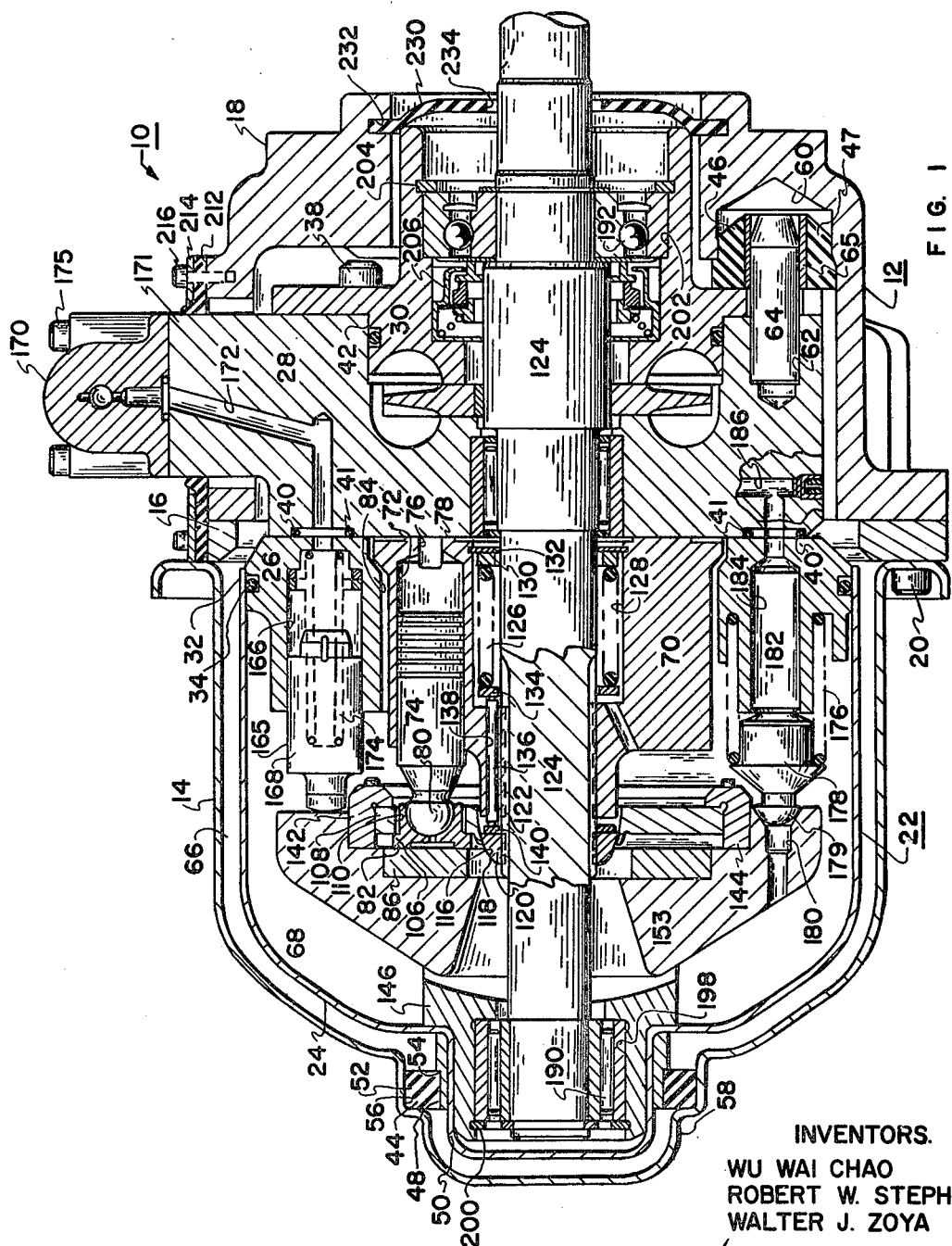
FIG. 1 is a longitudinal transverse section of a fluid pressure energy translating device taken along line 1—1 of FIG. 3.

Referring now to the several figures, there is shown a presently preferred, but merely illustrative embodiment of the inventive principles, a pump 10 of the cantilever piston type. An outer housing 12 of the pump 10 comprises three parts: an outer bell-shaped dome 14, a spacer 16, and a cover 18 secured together by bolts 20. Cover 18 includes a mounting flange 19 having mounting holes 21 therein.

Within the outer housing 12, there is mounted an inner housing 22 which comprises an inner bell-shaped dome 24, a yoke support saddle 26, a valve block 28, and a retainer 30. The rear end 32 of the inner dome 24 is fitted around the outer periphery of the yoke support saddle 26, and O ring seal 34 insures a fluid tight juncture of the two parts. The yoke support saddle 26 and the retainer 30 are secured on opposite sides of the valve block 28 by means of bolts 36 and 38, respectively, while O rings 40, 41, and 42 insure a fluid tight juncture between the corresponding parts.

The inner housing 22 is suported within the outer housing 12 by means of an axially aligned flexible bushing 44 disposed between the inner periphery of the front end of outer dome 14 and the outer periphery of the front end of the inner dome 24, and three flexible bushings—one of which is indicated at 46—disposed between the inner housing at the valve block end and the outer housing cover 18. The flexible bushing 44 comprises a sleeve 48 which is fitted about a hub 50 formed on the front end of the inner dome 24 and an annular shaped flexible material 52 such as rubber is bonded to the sleeve 48 within a groove 54 formed therein. The outer periphery of the flexible material 52 is snugly fitted into a shoulder 56 on the inner periphery of a hub 58 formed on the front end of the outer dome 14. The flexible bushing indicated by the numeral 46 comprises a flexible mount 47 such as rubber which is snugly fitted into a bore 60 formed in the outer housing cover 18. A plurality of bores are in the inner housing, one of which is indicated at 62, which extend through the retainer 30 and valve block 28, and are adapted to receive one end of a mounting pin 64. The pin 64 is fitted within a metal sleeve 65 which is bonded within the flexible mount 47. Thus, the inner housing is flexibly supported and isolated from the outer housing by means of the flexible mountings and an air cavity 66 formed between the two housings.

Figure 2:
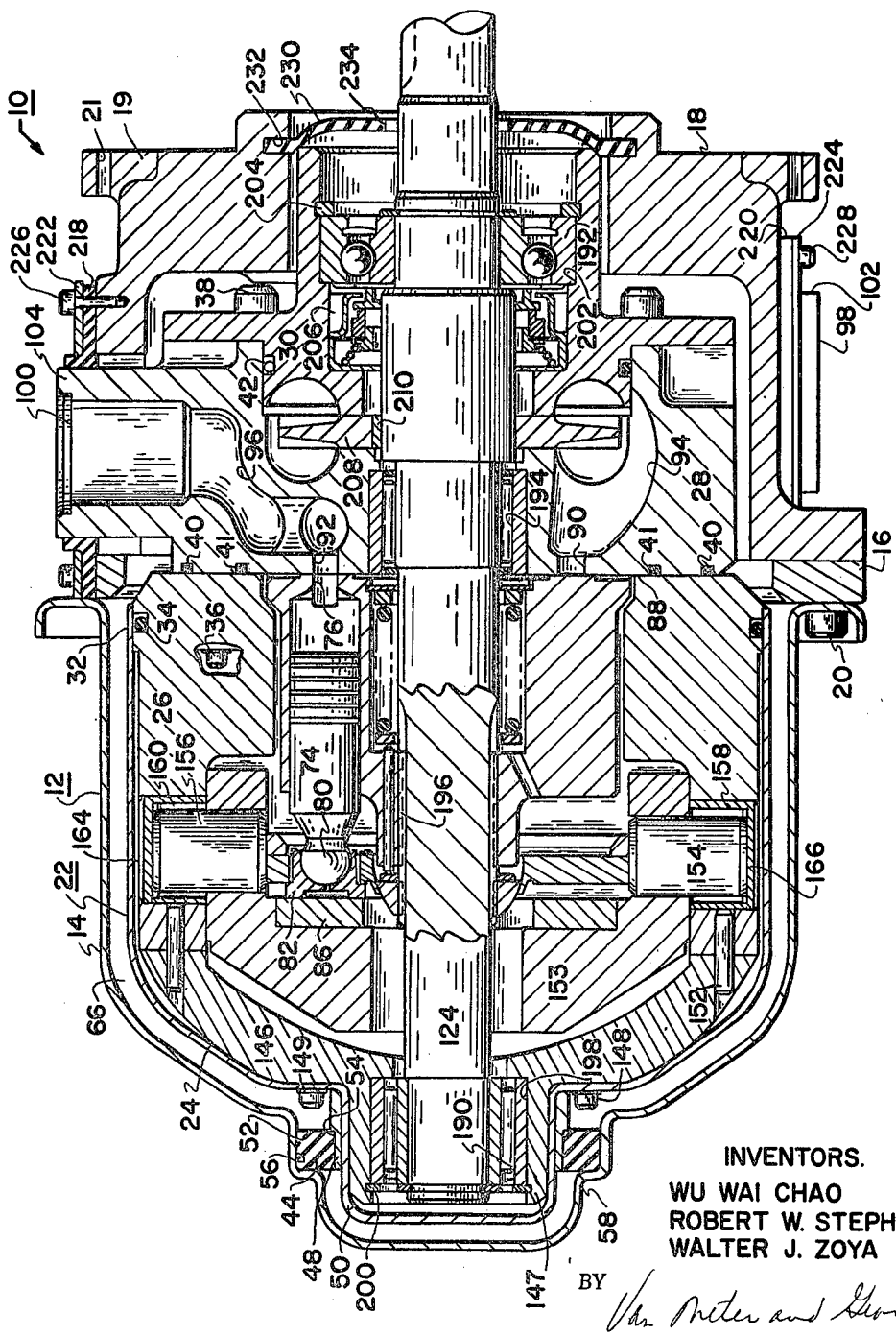
FIG. 2 is a longitudinal transverse section of a fluid pressure energy translating device taken along line 2—2 of FIG. 3.
Figure 3:
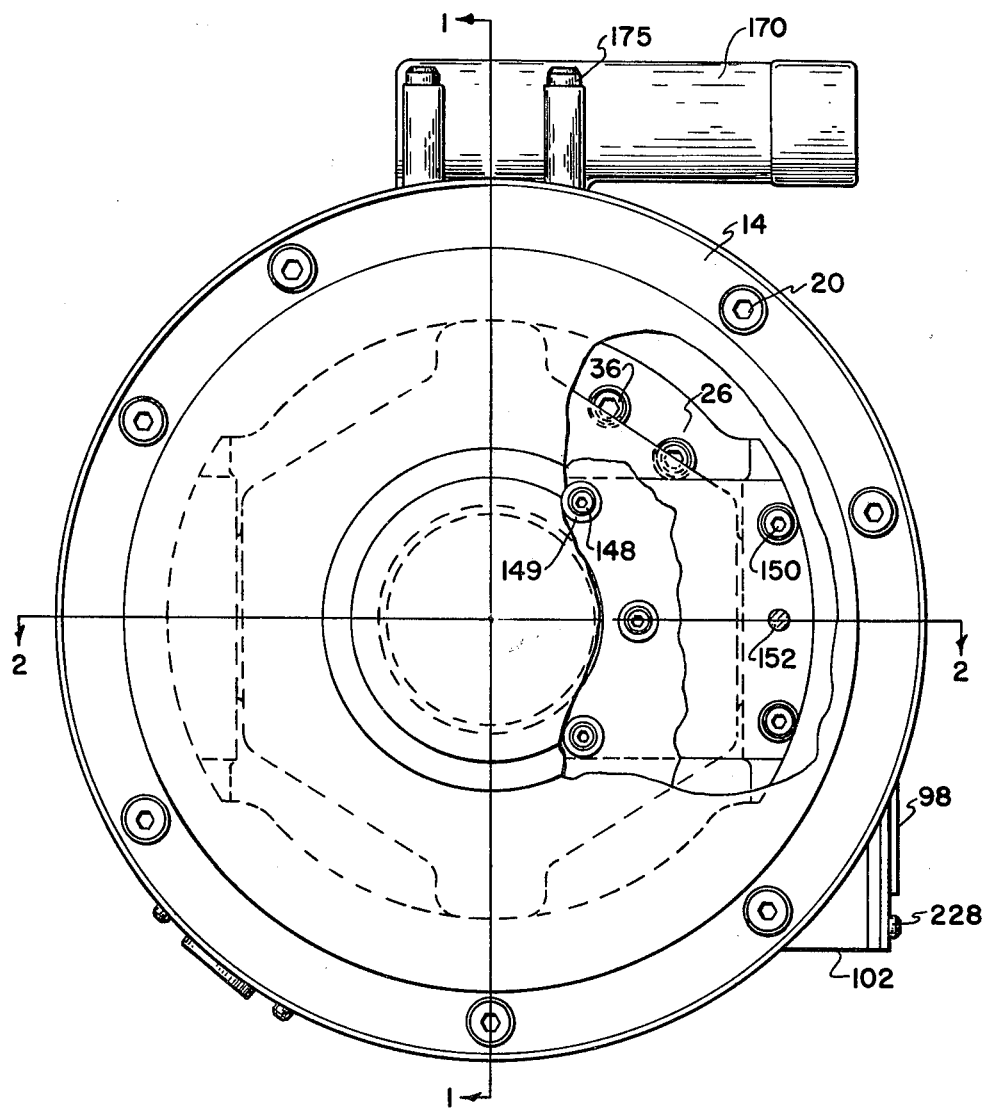
FIG. 3 is a partially sectioned front view of the fluid pressure energy translating device shown in FIG. 1.

Within the inner housing dome 24, there is provided a chamber 68 having a cylinder barrel 70. Cylinder barrel 70 is provided with a plurality of piston cylinders 72 each having a piston 74 axially slidable therein and cylinder ports 76 for communicating each of the cylinders with a front face 78 of the cylinder barrel. Pistons 74 each have spherical ends 80 on which are swaged the socketed shoes 82. The cylinder barrel 70 is positioned radially within a bore 84 in the yoke support saddle 26 and axially between the valve block 28 and an inclined thrust plate 86. The valve block face 88 has arcuate ports 90 and 92 (FIG. 2) which communicate with low and high pressure operating passages 94 and 96 respectively. The valve block arcuate ports 90 and 92 serve in a well-konwn manner to provide a properly phased connection between the cylinder ports 76 and the operating passages 94 and 96. The cylinder ports 76 will communicate successively with the valve plate arcuate ports as the cylinder barrel rotates with fluid being drawn in from the low pressure operating passage 94 through arcuate port 90 and into the cylinder 72 and is expelled via arcuate port 92 into the high pressure operating passage 96. The low and high pressure operating passages are connected to inlet and outlet external connection ports 98 and 100 within bosses 102 and 104, respectively. The inlet and outlet external connection ports 98 and 100 are adapted to be connected respectively to a source of fluid and to a fluid pressure energy translating device not shown for use by the same.

Piston shoes 82 each have outwardly extending flanges 106 which are contacted by an annular cage 108 with holes 110 corresponding to each piston 74. Cage 108 has a truncated spherical bore 116 therein which contacts a spherical outer surface 118 of a collar 120 which is provided with a female spline to engage a male spline 122 on a drive shaft 124.

A spring 126 is positioned in a central recess 128 in cylinder barrel 70. One end of spring 126 acts against a washer 130 and a snap ring 132 in cylinder barrel 70. The other end of spring 126 is exerted against a washer 134 which abuts a plurality of push rods 136 extending axially through holes 138 in cylinder barrel 70 into engagement with a washer 140 abutting collar 120. The force exerted by the spring 126 thus brings the face 78 of the cylinder barrel 70 into engagement with the valve block face 88 and also biases the shoes 82 into engagement with the inclined thrust plate 86.

To prevent the piston shoes from lifting at very high speed operation, a positive shoe retraction system is provided by incorporating two L-shaped metal segments 142 and 144 which form an annulus with the thrust plate 86 and provide a tract to confine the annular cage 108 and piston shoes 82.

There is provided within the inner periphery of the inner dome 24 at the hub end a saddle bridge 146 which is attached to the yoke support saddle 26 by means of bolts 150 to provide lateral support of the drive shaft bearing 190. Pins 152 maintain proper alignment between the bridge 146 and saddle 26.

Inner dome hub 50 fits closely over a bearing boss 147 formed on bridge 146 and is secured thereto by means of bolts 148. Composite washer O ring assemblies 149 under each bolt 148 distribute bolt loads on the inner dome surface and seal oil within the periphery of the inner dome.

The thrust plate 86 is mounted within a yoke plate 153 which is adapted to be pivoted about a centerline which extends through trunnions 154 and 156 which are mounted on opposite sides of the yoke plate. Within the saddle 26, there is provided pintle bearings 158 and 160 which carry the trunnions 154 and 156, respectively. Pintle bearings 158 and 160 are maintained in position by means of retainers 162 and 164, respectively. The displacement of the unit may be varied by tilting the yoke plate and thus the thrust plate, at various angles about an axis perpendicular to the cylinder barrel. This is accomplished by rotating the yoke plate 153 about its pintle bearings 158 and 160 by means of an actuator 165 which is disposed in a bore 166 within the yoke support saddle 26. The actuator comprises a piston 168 upon which a control pressure acts to supply the motive force for actuating the yoke plate. The control pressure is supplied to the actuator by means of a compensator 170 via passage 172. The compensator is of the pressure actuated type and its operation is well-known in the art, and is attached to a boss 171 extending from the valve block 28 by means of bolts, one of which is indicated at 175. A spring 174 is provided inside the actuating piston 168 to hold the latter against the yoke plate in order to prevent piston-yoke separation and the attendant noise generation. Diametrically opposed to the actuator 165 there is provided a control spring 176 which pushes the yoke plate toward the full flow position and opposes the rotational forces imposed upon the yoke plate 153 by means of the actuator 165. When control pressure is admitted to the actuator, the actuator piston will act against the yoke plate, pivoting the same about its pintle axis and tend to shift the device to zero displacement. When the control pressure is decreased, the spring 176 will pivot the yoke plate in the opposite direction and tend to shift the device toward full displacement. The control spring acts against the yoke plate through a spring guide 178, the front hemispherical head 179 of which is seated within a recess 180 formed within the yoke plate. In addition to the control spring, there is provided an auxiliary piston 182 in a bore 184 within the yoke support saddle to supplement the action of spring 176 with an additional force which is proportional to pump load pressure. The motive force for the auxiliary piston 182 is provided by the discharge pressure acting thereon and is supplied thereto by means of passage 186. The forces exerted by the auxiliary piston cause the pressure acting against the control piston to rise to achieve a balance between the two. This increases the force between the control piston and yoke plates thus reducing the tendency for separation and resultant noise generation at this point.

The drive shaft 124 is supported by means of bearings 190 and 192, and 194, and is effective to transmit torque from a prime mover, not shown, to the cylinder barrel through a driving connection at a spline indicated by the numeral 196.

The bearing 190 is located in a recess 198 formed within the saddle bridge 146 at the front end of the inner dome and is maintained therein by means of a retainer 200. The bearing 192 is located in a recess 202 formed within the retainer 30 at the rear end of the inner housing and is retained therein by means of retainer 204. A conventional face type shaft seal is provided at 206 to prevent leakage from the device and is maintained in position by means of the shaft bearing 192.

Since noise reduction can be had by increasing the rigidity of a structural member, a third shaft bearing 194 is provided. Bearing 194 not only increases the bending stiffness of the drive shaft, but the radial motion of the cylinder barrel, pistons, and other rotating members is substantially reduced with a corresponding reduction in noise level. The bearing 194 is of the roller type similar to the bridge bearing 190. However, instead of using a separate inner race as in the bridge bearing 190, the shaft may be locally induction hardened and ground and may serve as the inner race of bearing 194. In addition to the general reduction in the noise level, the bearing 194 reduces the shaft annularity in the bridge bearing 190, thus assuring a long and useful life for the same.

The low pressure operating passage 94 has incorporated therein a peripheral inducer 208 for supercharging the pump inlet. Such supercharging reduces the possibility of cavitation and results in a corresponding reduction in the level of noise generated by the device. The inducer is maintained in position about the shaft 124 by means of a key 210.

As aforementioned, the compensator 170 is mounted on a boss 171 extending from the valve block 28. The boss 171 extends through the outer housing cover 18 to permit easy access to the compensator for repair or adjustment thereto. There is provided a flexible sound seal 212 made from a dense material to reduce the escape of noise generated within the outer housing to the ambient air through the gaps between the valve block bosses and the outer housing cover 18. The sound seal 212 is clamped firmly to the housing cover 18 by means of plate 214 and bolts 216, thus producing a very tight seal around the boss 171. Inlet and outlet bosses have similar arrangements to confine within the outer housing the noise generated therein, comprising, respectively, sound seals 218 and 220 which are secured to the outer housing cover 18 by means of cover plates 222 and 224, and bolts 226 and 228. A sound seal 230 positioned within a recess 232 of the outer housing between the cover and inner housing retainer 30 completes the enclosure of the air space 66 between the two housings. A bore 234 through seal 230 is provided for the drive shaft.

In operation, the device functions as a pump in a manner well known in the art. Noise and vibrations generated by the pumping cartridge is retained therein by means of the air space between the housing, the flexible bushings, and sound seals, while the construction of the yoke support saddle removes the pump loads from the housing, further reducing noise and vibration transmission to the surroundings.

Tests on a device constructed in accordance with the foregoing description have indicated that pump airborne and structural noises are respectively one third and one tenth that of a conventional pump having the same fluid displacement and operating at comparable speeds, pressures, and temperatures.

It will thus be seen that the present invention has provided a fluid pressure energy translating device having a construction which embodies design features for attaining quietness in operation, which is compact and rugged, and utilizes many standard production parts, and which has easy accessibility for servicing, in which the cylinder block, pistons, and associated parts may be removed without disturbing the pump inlet and outlet connections or the pump mounting.

While the form of embodiment of the invention as herein disclosed constitutes a preferred form, it is to be understood that other forms might be adopted.

What is claimed is as follows:

1. A fluid pressure energy translating device having inlet and outlet passages, one of which is a low pressure operating passage, the other a high pressure operating passage, comprising:
   an outer housing;
   an inner housing having:
      a valve block having arcuate ports formed therein, one of which is a low pressure port, the other a high pressure port;
      a cam plate mounting unit;
      means for fastening said mounting unit to said valve block;
      a bell-shaped dome, the open end of which circumscribes said mounting unit;
      means for flexibly mounting and isolating said inner housing within said outer housing, forming an air space between said housings, said flexible mounting means being comprised of; a first isolation mount disposed between the outer periphery of the outer end of said dome and the inner periphery of a portion of said outer housing, and means for maintaining said first isolation mount in position; a plurality of isolation mounts disposed between said valve block and a portion of the inner periphery of said outer housing; and means for maintaining said plurality of isolation mounts in position;
   a pumping mechanism mounted within said bell-shaped dome comprising:
      a cylinder barrel having a plurality of pistons with inner ends disposed for reciprocation within cylinders in said barrel and with outer ends protruding from one end of said barrel, said cylinder barrel being mounted upon a rotatable shaft and adapted for rotary movement relative to said arcuate ports with said cylinders communicating successively with said arcuate ports;
      an inclined cam plate facing said outer piston ends, said cam plate having a bearing surface thereon, the outer ends of said pistons having bearing means adapted to slidably follow said bearing surface, said cam plate being pivotally mounted on said cam plate mounting unit; and,
      means for pivoting said cam plate;
   a bridge disposed within the bell-shaped dome, said bridge being carried by said cam plate mounting unit and having bearing means formed therein for receiving and supporting an end of said shaft;
   second bearing means formed in said inner housing for receiving and supporting the other end of said shaft; and,
   means for connecting said low and high pressure arcuate ports respectively to said low and high pressure operating passages.

2. A fluid pressure energy translating device having inlet and outlet passages, one of which is a low pressure operating passage, the other a high pressure operating passage, comprising:
   an outer housing;
   an inner housing having:
      a valve block having arcuate ports formed therein, one of which is a low pressure port, the other a high pressure port;
      a cam plate mounting unit;
      means for fastening said mounting unit to said valve block;
      a bell-shaped dome, the open end of which circumscribes said mounting unit;
      means for flexibly mounting and isolating said inner housing within said outer housing, forming an air space between said housings, said flexible mounting means being comprised of; a first isolation mount disposed between the outer periphery of the outer end of said dome and the inner periphery of a portion of said outer housing, and means for maintaining said first isolation mount in position; a plurality of isolation mounts disposed between said valve block and a portion of the inner periphery of said outer housing; and means for maintaining said plurality of isolation mounts in position;

a pumping mechanism mounted within said bell-shaped dome comprising:

a cylinder barrel having a plurality of pistons with inner ends disposed for reciprocation within cylinders in said barrel and with outer ends protruding from one end of said barrel, said cylinder barrel being mounted upon a rotatable shaft and adapted for rotary movement relative to said arcuate ports with said cylinders communicating successively with said arcuate ports;

an inclined cam plate facing said outer piston ends, said cam plate having a bearing surface thereon, the outer ends of said pistons having bearing means adapted to slidably follow said bearing surface, said cam plate being pivotally mounted on said cam plate mounting unit; and, means for pivoting said cam plate.

References Cited

UNITED STATES PATENTS

| | | |
|---|---|---|
| 2,476,515 | 7/1949 | Stevens. |
| 2,662,375 | 12/1953 | Postel et al. |
| 2,928,961 | 3/1960 | Morrill. |
| 3,090,463 | 5/1963 | Yanoa. |
| 3,202,101 | 8/1965 | Tinker et al. _____ 103—162 |
| 3,266,434 | 8/1966 | McAlvey _____ 103—162 |
| 3,303,794 | 2/1967 | Hagemann _____ 103—162 |

WILLIAM L. FREEH, Primary Examiner

U.S. Cl. X.R.

230—232